US006965399B1

(12) United States Patent
Oka et al.

(10) Patent No.: US 6,965,399 B1
(45) Date of Patent: Nov. 15, 2005

(54) CAMERA CONTROL SYSTEM

(75) Inventors: Hiroto Oka, Kawasaki (JP);
Tsuneyoshi Takagi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/126,833

(22) Filed: Jul. 30, 1998

(30) Foreign Application Priority Data

Aug. 1, 1997 (JP) .................................. 9-207923

(51) Int. Cl.[7] ...................... H04N 5/232; H04N 5/225; H04N 7/14
(52) U.S. Cl. ........................... 348/211.99; 348/207.11; 348/207.1; 348/14.05; 348/211.13; 348/211.12; 348/211.1; 348/211.3; 348/14.09
(58) Field of Search ........................ 348/14.05, 14.09, 348/207.1, 207.11, 211.99, 211.3, 211.1, 348/211.12, 211.11, 211.13

(56) References Cited

U.S. PATENT DOCUMENTS 5,760,917 A * 6/1998 Sheridan .................. 348/211.3
6,067,624 A * 5/2000 Kuno ......................... 713/200
6,133,941 A * 10/2000 Ono ......................... 348/14.05
6,137,485 A * 10/2000 Kawai et al. ................ 345/719
6,239,836 B1 * 5/2001 Suzuki et al. ................ 345/716
6,313,875 B1 * 11/2001 Suga et al. ............... 348/14.08
6,380,972 B1 * 4/2002 Suga et al. ............ 348/333.02
6,414,716 B1 * 7/2002 Kawai ........................ 348/211

FOREIGN PATENT DOCUMENTS

JP  7-143385   6/1995
JP  8-237635   9/1996
JP  8-317374   11/1996

* cited by examiner

Primary Examiner—Wendy R. Garber
Assistant Examiner—James M. Hannett
(74) Attorney, Agent, or Firm—Morgan & Finnegan, LLP

(57) ABSTRACT

When a control command for a video camera is entered, a client issues an acquisition request for a video camera control right and a camera server issues a permission command for the video camera control right in response to the acquisition request for the video camera control right from the client, and controls the video camera in accordance with the control command from the client.

28 Claims, 8 Drawing Sheets

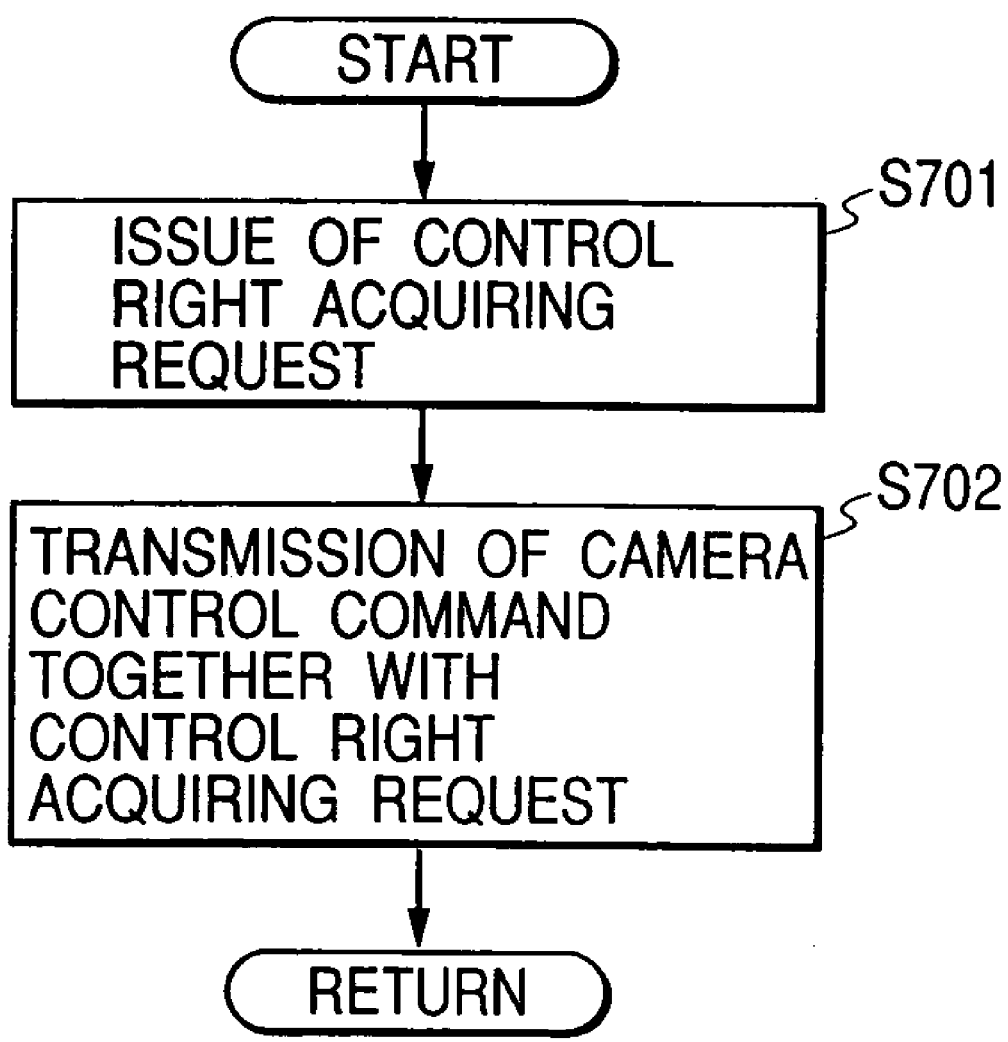

CAMERA CONTROL SYSTEM

BACKGROUND OF THE INVENTION

1. Field of the Invention

The present invention relates to a camera control system and method for remotely controlling a camera suitable for use with video conference systems, camera monitoring systems and the like.

2. Related Background Art

The assignee of the present invention has proposed a system such as camera monitoring systems and video conference systems, by which a plurality of clients at remote sites not only can look at an image picked up by a video camera, but also can remotely controlled the image pickup direction, zoom magnification factor and the like of the video camera.

In such a camera control system, if a plurality of clients access the same video camera to control it, the controls by these clients cannot be processed at the same time. Therefore, a system has been proposed in which only one client is given a "camera control right" at a time.

In a camera control system incorporating the concept of "camera control right", a client may advertently input a camera control command before an acquisition request for the camera control right is entered.

SUMMARY OF THE INVENTION

It is an object of the present invention to solve the above problem and provide a system capable of controlling a camera by issuing an acquisition request for a camera control right even if a camera control command is input inadvertently before the acquisition request for the camera control right is issued.

In order to achieve the above object, one aspect of the invention provides a camera control system capable of controlling a video camera connected to a camera server by transmitting a video camera control command from a client, wherein the client comprises: input means for inputting a video camera control command; and control request transmitting means for transmitting an acquisition request for a video camera control right to the camera server, when the video camera control command is input from the input means, and the camera server comprises: permission command issuing means for issuing a permission of the video camera control right to the client, in response to the acquisition request for the video camera control right issued by the control request transmitting means of the client; and control means for controlling the video camera in accordance with the video camera control command issued by the client.

According to another aspect of the invention, there is provided a client capable of controlling a video camera via a network, comprising input means for inputting a video camera control command; and control request transmitting means for transmitting an acquisition request for a video camera control right to the camera server, when the video camera control command is input from the input means.

According to another aspect of the invention, there is provided a camera server for controlling a video camera in accordance with an input video camera control command, comprising control means for controlling the video camera in accordance with the video camera control command issued by a client granted a video camera control right; register means for registering the client granted the video camera control right; and reception means for receiving the video camera control command, wherein if the video camera control command from a client not registered in the register means is received, the register means registers the client if there is no other client registered, and the control means controls the video camera in accordance with the video camera control command.

According to another aspect of the invention, there is provided a method of controlling a video camera by a client via a network comprising the steps of: inputting a video camera control command; and transmitting an acquisition request for a video camera control right to the camera server, when the video camera control command is input.

According to another aspect of the present invention, there is provided a method of controlling a video camera by a camera server in accordance with an input video camera control command, comprising the steps of: controlling the video camera in accordance with the video camera control command issued by a client granted a video camera control right; registering the client granted the video camera control right; and receiving the video camera control command, wherein if the video camera control command from a client not registered is received, the client is registered if there is no other client registered, and the video camera is controlled in accordance with the video camera control command.

According to another aspect of the present invention, there is provided a storage medium storing a computer readable program for controlling a video camera by a client via a network, wherein the program comprises the steps of: inputting a video camera control command; and transmitting a control acquisition request for a video camera control right to the camera server, when the video camera control command is input.

According to another aspect of the present invention, there is provided a storage medium storing a computer readable program for controlling a video camera by a camera server in accordance with an input video camera control command, wherein the program comprises the steps of: controlling the video camera in accordance with the video camera control command issued by a client granted a video camera control right; registering the client granted the video camera control right; and receiving the video camera control command, wherein if the video camera control command from a client not registered is received, the client is registered if there is no other client registered, and the video camera is controlled in accordance with the video camera control command.

The other objects and features of the present invention will become apparent from the following detailed description of embodiments when read in conjunction with the accompanying drawings.

BRIEF DESCRIPTION OF THE DRAWINGS

FIG. 7 is a flow chart illustrating the detailed operations of Step S553 shown in FIG. 5 different from those illustrated in FIG. 6.

DETAILED DESCRIPTION OF THE PREFERRED EMBODIMENTS

Embodiments of the present invention will be described with reference to the accompanying drawings. In the embodiments, if a client (computer terminal) accessing a remote video camera and receiving video data enters a camera control command without acquiring a video camera control right, an acquisition request for the camera control right is automatically issued.

Figure 1:
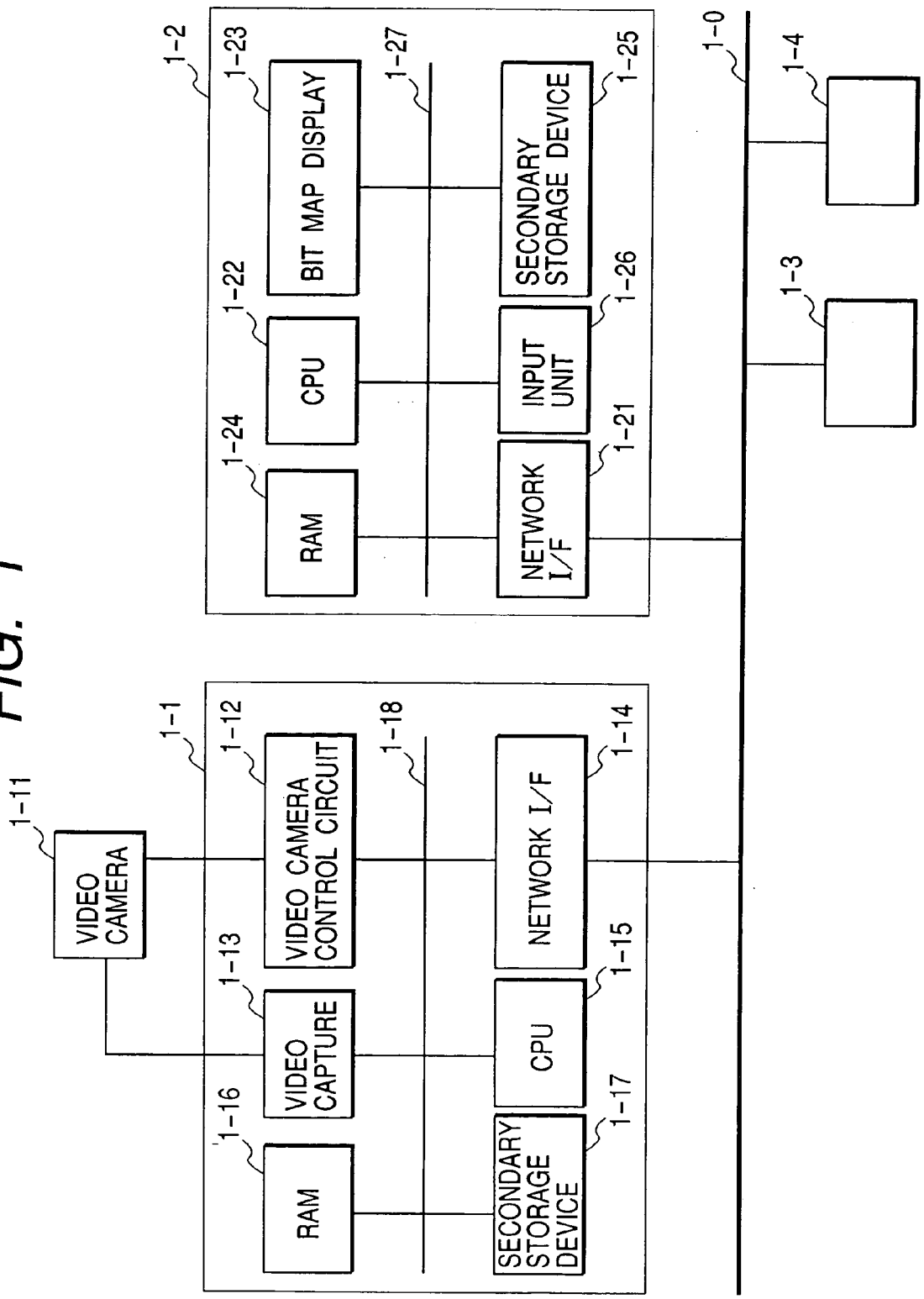
FIG. 1 a block diagram showing the structure of a camera control system according to an embodiment of the invention.

FIG. 1 is a block diagram showing the structure of a camera control system according to an embodiment. In FIG. 1, reference numeral 1-1 represents a camera server, and reference numerals 1-2, 1-3, 1-4, . . . represent a client (computer terminal) which can control a video camera 1-11, the control operation being described later. A large number of clients can be connected to a network 1-0.

The camera server 1-1 controls the video camera 1-11 directly connected thereto. The camera server 1-1 transmits video data supplied from the video camera 1-11 to an accessing client.

Reference numeral 1-12 represents a video camera control circuit which controls an image pickup direction (pan and tilt angles), a zoom magnification factor and the like of the video camera 1-11. Reference numeral 1-13 represents a video capture which captures an image taken with the video camera 1-11.

A secondary storage device 1-17 stores a program for controlling the operation of the camera server 1-1. Reference numeral 1-16 represents a RAM. A CPU 1-15 loads the program in RAM 1-16 and executes it to thereby control the whole of the camera server 1-1.

A network I/F 1-14 performs data transfer to and from a client via a network. Reference numeral 1-18 represents a system bus connecting components of the camera server.

Reference numeral 1-23 represents a bit map display for displaying an image or the like taken with the video camera 1-11. Reference numeral 1-26 represents an input unit which is a pointing device such as a keyboard and a mouse. With this input unit 1-26, a cursor displayed on the screen of the bit map display 1-23 is moved to a particular icon to enter a camera control command.

A secondary storage unit 1-25 stores a program for controlling the operation of the client 1-2. Reference numeral 1-24 represents a RAM. A CPU 1-22 loads the program in RAM 1-24 and executes it to thereby control the whole of the client 1-2.

A network I/F 1-21 performs data transfer to and from the camera server 1-1 via the network. Reference numeral 1-27 represents a system bus connecting components of the client 1-2.

The other clients 1-3, 1-4, . . . have a structure similar to that of the client 1-2 described above.

Figure 2:
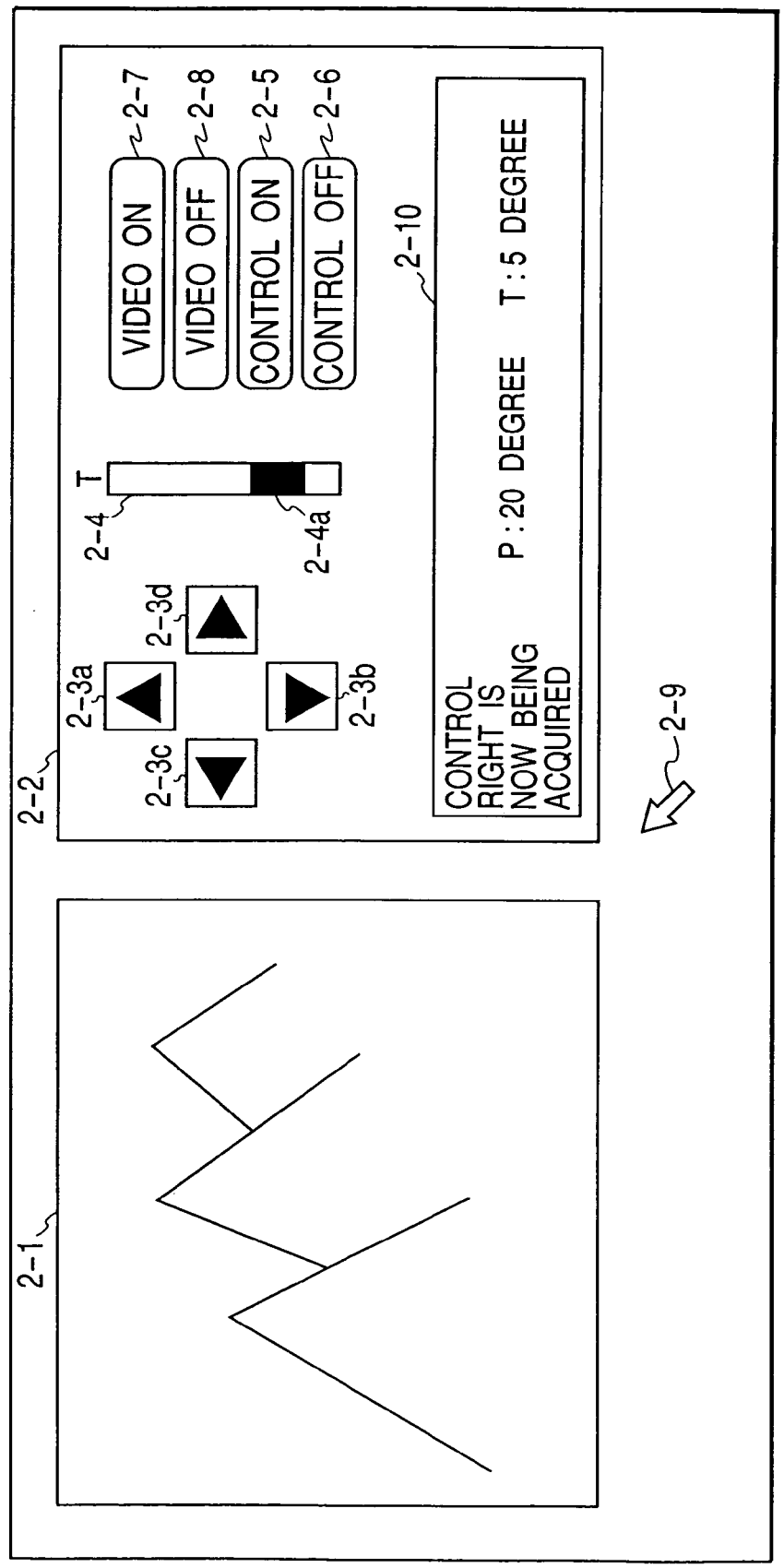
FIG. 2 is a diagram showing an example of a displayed image on a bit map display.

FIG. 2 shows an example of an image displayed on the bit map display 1-23 of the client 1-2.

A video display window 2-1 is used for displaying an image taken with a camera connected to an accessed camera server. A camera control window 2-2 is used for entering an acquisition request for the camera control right of an accessed camera or for entering a camera control command.

Buttons 2-3a, 2-3b, 2-3c, 2-3d in the camera control window 2-2 are used for generating a control command of changing the image pickup direction to up, down, right, or left direction. By using a mouse of the input unit 1-26, a cursor displayed on the screen is moved to a button corresponding to the direction to be changed, and clicked to thus enter a control command for the image pickup direction (pan and tilt angles).

A scroll bar 2-4 is used for changing the zoom magnification factor. By using the mouse, a button 2-4a is dragged to thus enter a control command for the zoom magnification factor.

A control ON button 2-5 is used for issuing an acquisition request for the camera control right of an accessed camera (camera corresponding to an image displayed on in the video display window 2-1), by clicking this button. A control OFF button 2-6 is used for issuing a discard request for the camera control right now in possession, by clicking this button.

A video ON button 2-7 is used for accessing the camera server 1-1 to receive an image taken with the camera 1-11. When this button 2-7 is clicked, image data is supplied from the camera server 1-1 and the image taken with the camera 1-11 is displayed on the video display window 2-1. A video OFF button 2-8 is used for stopping an access to the camera server 1-1. A display field 2-10 is used for displaying information on whether the client is acquiring the camera control right, or other information.

Figure 3:
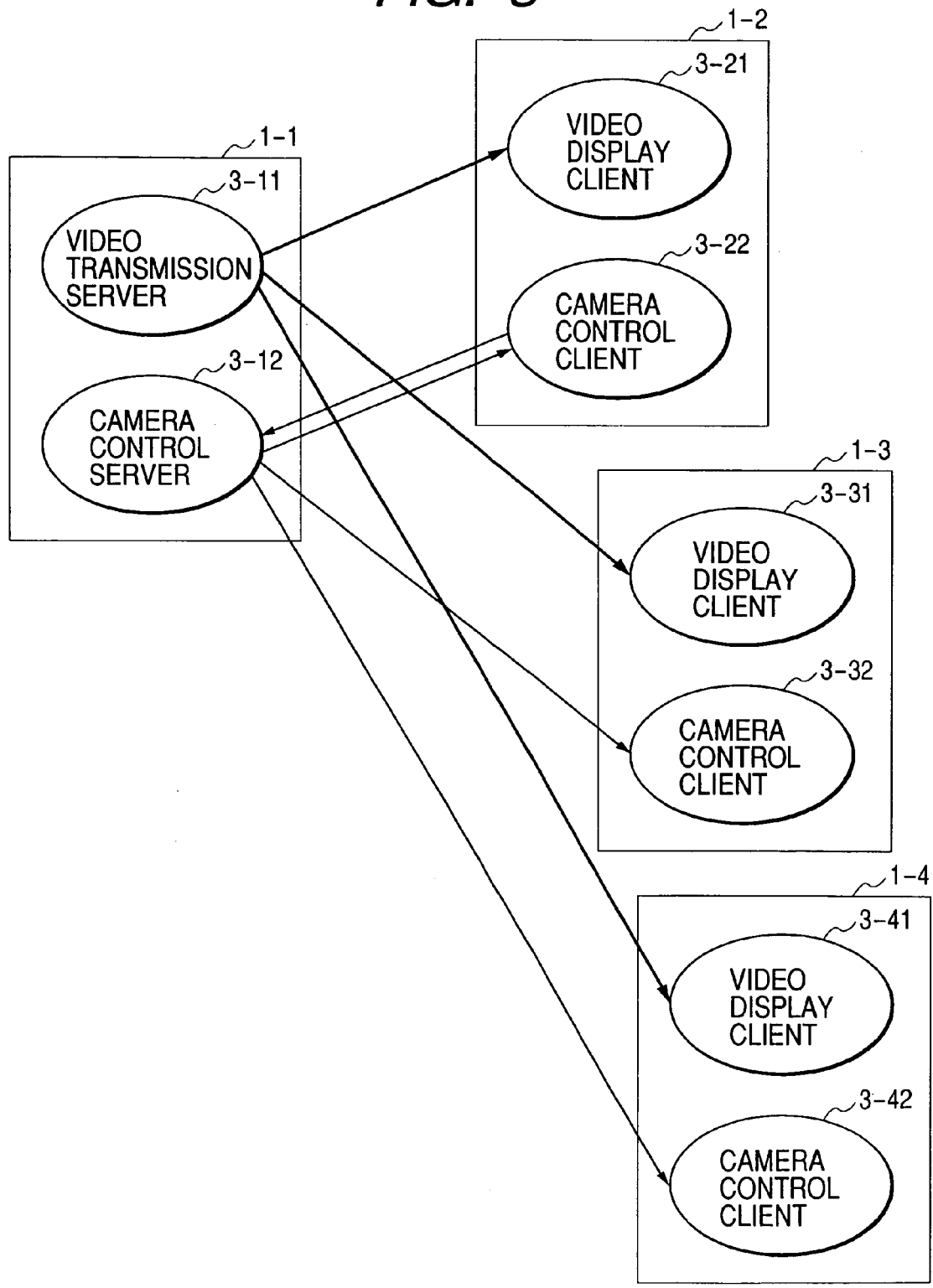
FIG. 3 shows the software configuration of the camera control system of the embodiment.

FIG. 3 is a diagram showing the software configuration of the camera control system of the embodiment. In the camera server 1-1, software of a video transmission server 3-11 and a camera control server 3-12 runs. In the camera clients 1-2, 1-3, 1-4, . . . , software of video display clients 3-21, 3-31, 3-41, . . . , 3-n1 and camera control clients 3-22, 3-32, 3-42, . . . , 3-n2 runs.

The video transmission server 3-11 performs video data capture and compression, and transmits video data to an accessed camera client. The camera control server 3-12 manages acquisition requests for the camera control right, discard requests for the camera control right and the like supplied from clients in order not to give the camera control right to a plurality of clients at a time.

The camera control server 3-12 performs the camera control in accordance with a camera control command entered from a client having the camera control right (in the example shown in FIG. 3, client 1-2), the camera control command including an image pickup direction, a zoom magnification factor and the like. When the camera control is performed, the camera control server 3-12 broadcasts camera parameter information to all clients accessing the camera server 1-1 at that time, the camera parameter information including current pan and tilt angles, a current zoom magnification factor and the like.

The video display clients 3-21, 3-31, 3-41, . . . , 3-n1 receive compressed video data transmitted from the video transmission server 3-11 via the network, expands it, and display the image taken with the camera.

The camera control clients 3-22, 3-32, 3-42, . . . , 3-n2 display the camera control window 2-2 on the display 1-21 to provide a user interface for inputting a camera control command. If the client has the camera control right, an input camera control command is transmitted to the camera server 1-1.

Figure 4:
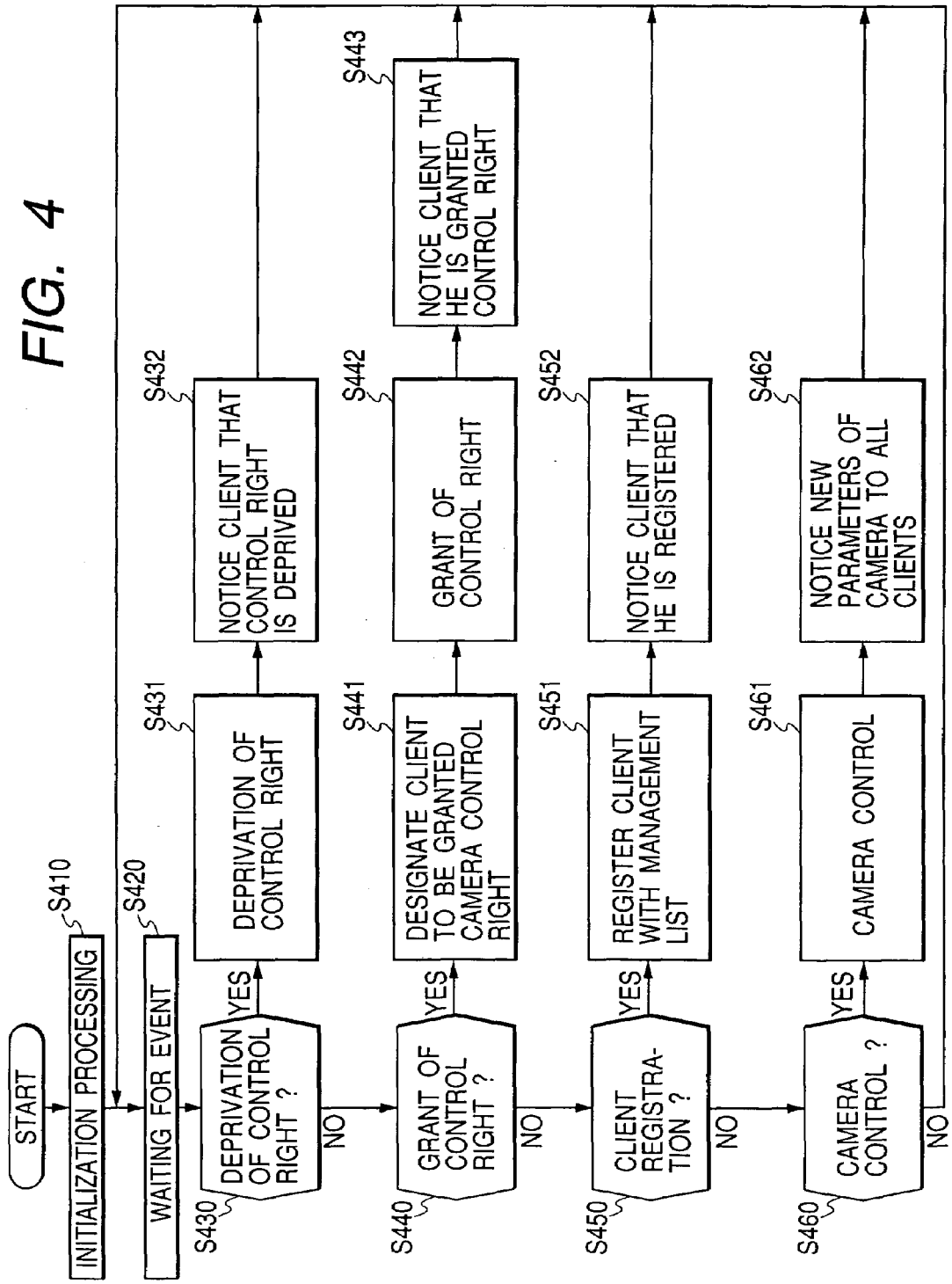
FIG. 4 is a flow chart illustrating the operation to be executed by a camera server.

The operation to be executed by the camera control server 3-12 will be described with reference to the flow chart shown in FIG. 4. A control program for this operation is stored in the secondary storage device 1-17, which is loaded in RAM 1-15 and executed by CPU 1-15.

At Step S410, an initialization process of the video camera 1-11 is performed to set specific values as pan and tilt angles and as a zoom magnification factor, and thereafter the flow advances to Step S420. If any event occurs at Step S420, the flow advances to Step S430. An event includes a command from a client connected to the network, a command for an operation in the camera server 1-1, and the like.

If the camera control right is being granted to some client at Step S430, it is checked from the issued event whether the client having the camera control right is to be deprived of the camera control right.

In this embodiment, the client having the camera control right is deprived of the camera control right under the following conditions: when the client having the camera control right issues the discard request for the camera control right; when a predetermined time elapses after the client was granted the camera control right; when the client having the camera control right is physically disconnected from the network; when a client having a priority order higher than that of the client having the camera control right issues an acquisition request for the camera control right; and other conditions.

If the occurred event satisfies any of the above conditions at Step S430, the client having the camera control right is deprived of the camera control right at Step S430. At Step S432, a deprivation notice of the camera control right is transmitted to the client which was deprived of the camera control right.

At Step S440 if an event such as an acquisition request for the camera control right is issued from a client, it is checked whether the client is granted the camera control right. In this embodiment, in addition to an event of the acquisition request for the camera control right, the camera control right is granted under the following conditions: when a standby state of camera control right acquisition is released which acquisition was requested by a client; if a client has previously reserved camera control right acquisition; if any client is not granted the camera control right and when only a camera control command issued from a client is received; and other conditions.

If the occurred event satisfies any one of the above conditions at Step S440, a client to be granted the camera control right is designated at Step S441. As the criterion for this designation, the camera control right may be granted to a client whose acquisition request for the camera control right was received earliest by the camera server, or to a client having the highest priority order among those clients issuing the acquisition request for the camera control right.

At Step S442 the camera control right is granted to the designated client. At Step S443 a notice of granted camera control right is transmitted to the granted client.

At Step S450 it is checked whether an acquisition request for the camera control right issued from a client is required to be registered, or whether a reservation for the camera control right issued from a client is required to be registered. If required, at Step S451 an acquisition request for the camera control right or a reservation for the camera control right is registered in a management list of the camera control server 3-12. At Step S452, a notice of registration is transmitted to the registered client. The management list registers therein information on a client granted the camera control right and on clients reserved for the camera control right.

At Step S460 if an event is a camera control command transmitted from a client granted the camera control right, then the flow advances to Step S461 whereat the camera is controlled in accordance with the camera control command. At Step S462, parameters such as the image pickup direction (pan and tilt angles) and the zoom magnification factor of the controlled camera are broadcast to all clients accessing the camera server 1-1.

The operation to be executed by the camera control client 3-22 of the client 1-2 of this embodiment will be described with reference to the flow chart shown in FIG. 5. A control program for this operation is stored in the secondary storage device 1-25, which is loaded in RAM 1-24 and executed by CPU 1-22. The clients 1-3, 1-4, . . . execute an operation similar to the client 1-2.

At Step S510, an initialization process is performed to initialize various parameters and flags, and thereafter the video ON button 2-7 is clicked to access the camera server 1-1. Next, an event is waited for at Step S520.

At Step S530, if an acquisition request for the camera control right is entered by clicking the control ON button 2-5, it is checked whether a camera control right holding flag is OFF, i.e., whether the client 1-2 has the camera control right. If not, the flow advances to Step S532 whereat an acquisition request for the camera control right is transmitted to the camera server 1-1, whereas if the camera control right is being granted, it is not transmitted.

At Step S540, if a discard request for the camera control right is entered by clicking the control OFF button 2-6, the flow advances to Step S541 whereat it is checked whether the camera control right holding flag is ON, i.e., whether the client 1-2 has the camera control right. If the camera control right is being granted, the flow advances to Step S542 whereat a discard request for the camera control right is transmitted to the camera server 1-1, whereas if not, the discard request for the camera control right is not transmitted so that any load is imposed on the network.

It is checked at Step S550 whether a control command such as an image pickup direction command and a zoom magnification factor command is entered by operating upon the buttons 2-3*a*, 2-3*b*, 2-3*c*, 2-3*d*, or scroll bar 2-4.

If the control command is entered, it is checked at Step S551 whether the camera control right holding flag is ON. If ON, i.e., if the camera control right is being granted, the entered camera control command is transmitted to the camera server 1-1 at Step S552.

If the camera control right holding flag is not ON at Step S551, i.e., if the camera control right is not being granted, the flow advances to Step S553 (processing 1).

Figure 5:
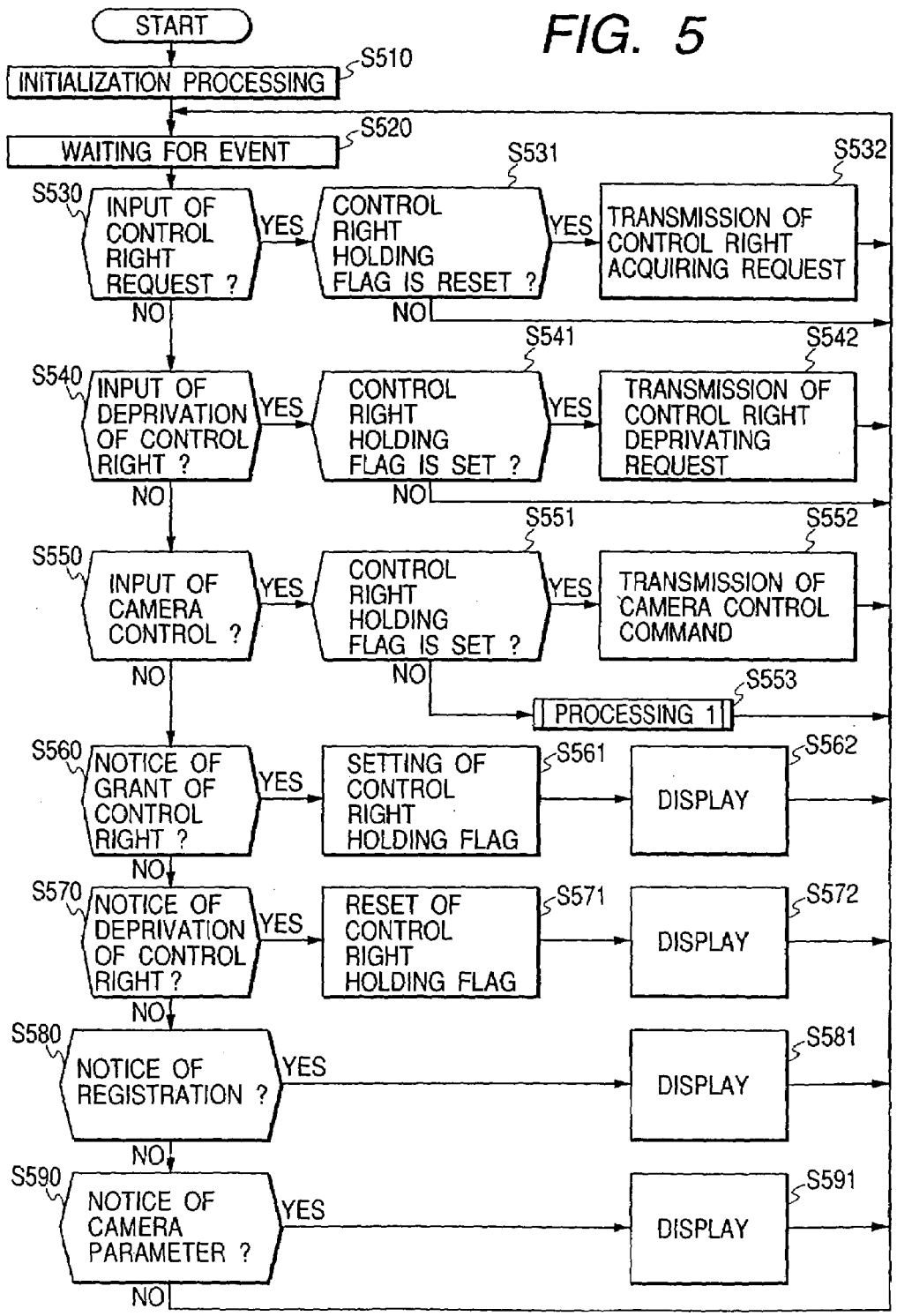
FIG. 5 is a flow chart illustrating the operation to be executed by a client.
Figure 6:
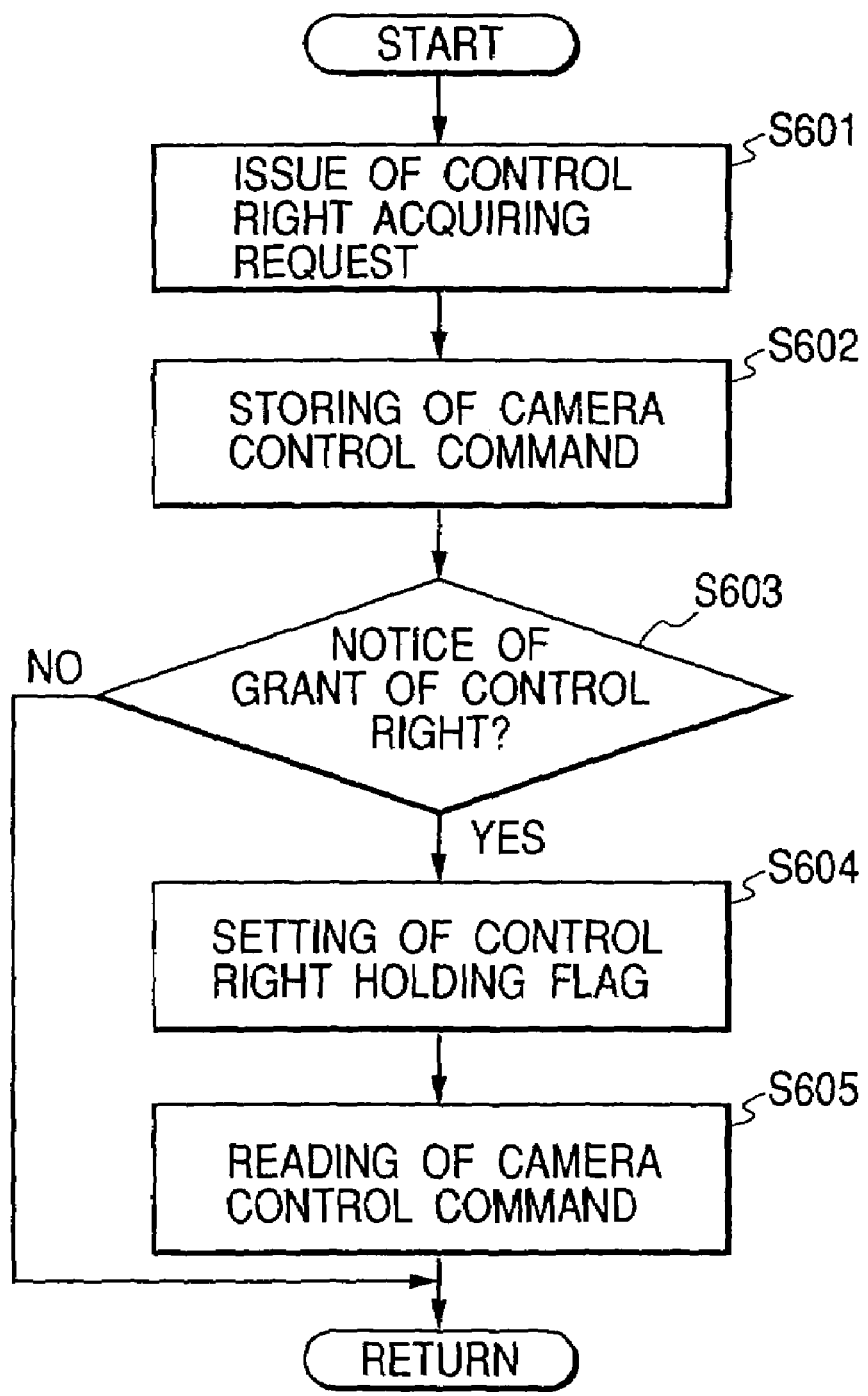
FIG. 6 is a flow chart illustrating the detailed operations of Step S553 shown in FIG. 5.

FIG. 6 is a flow chart illustrating the processing 1 at Step S553 shown in FIG. 5.

At Step S601, an acquisition request for the camera control right is issued and transmitted to the camera server 1-1. At Step S602, the camera control command entered at Step S530 is stored in RAM 1-24.

At Step S603, if the notice of granted camera control right is transmitted from the camera server, the camera control right holding flag is turned ON at Step S604 to notify the client of that the camera control right can be granted. At Step S605, the camera control command stored at Step S602 is read and transmitted to the camera server 1-1.

With the above processes, when the camera control command is entered even if the client has no camera control right, an acquisition request for the camera control right is first issued and then the camera control command is transmitted after the notice of granted camera control right is received.

Reverting to the flow chart shown in FIG. 5, it is checked at Step S560 whether an event is a notice of granted camera control right transmitted from the camera server 1-1. If the event is the notice of granted camera control right, the camera control right holding flag is turned ON and thereafter at Step S562 the effect that the granted camera control right is granted, is displayed on the display 2-10. This display may be performed by displaying a picture representative of a presence/absence of granted camera control right on a partial area of the display screen, or by changing the display style of the buttons 2-3a to 2-3d and scroll bar 2-4 in accordance with a presence/absence of granted camera control right.

At Step S580, it is checked whether an event is a notice of reservation of the camera control right and registration of the client. If the event is such a notice, the flow advances to Step S581 whereat the effect that the camera control right has been reserved, is displayed on the display 2-10.

At Step S590, it is checked whether an event is a camera parameter notice from the camera server 1-1. If the event is such a notice, the noticed current image pickup direction including the pan and tilt angles is displayed on the display 2-10.

As above, if a client enters a camera control command before the client is not granted the camera control right, the acquisition request for the camera control right is automatically issued and transmitted to the camera server so that the camera control command can be properly processed.

FIG. 7 is a flow chart illustrating the processing 1 at Step S553 shown in FIG. 5 different from the operation illustrated in FIG. 6.

At Step S701, when an acquisition request for the camera control right is issued, the acquisition request for the camera control right as well as the camera control command entered at Step S550 is transmitted to the camera server 1-1.

Figure 8A:
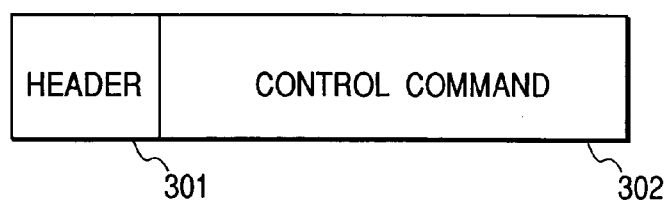
FIGS. 8A, 8B and 8C are diagrams showing the structure of data packets.
Figure 8B:
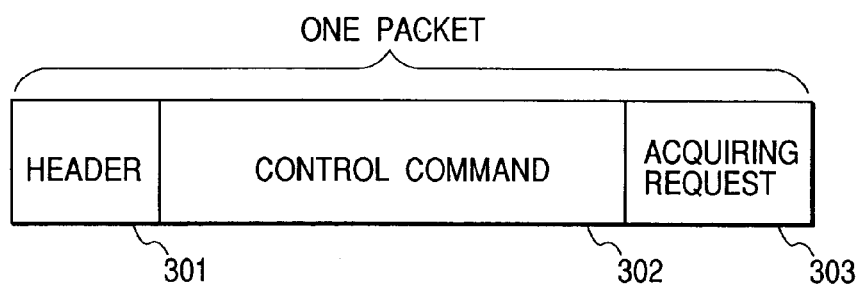
Figure 8C:
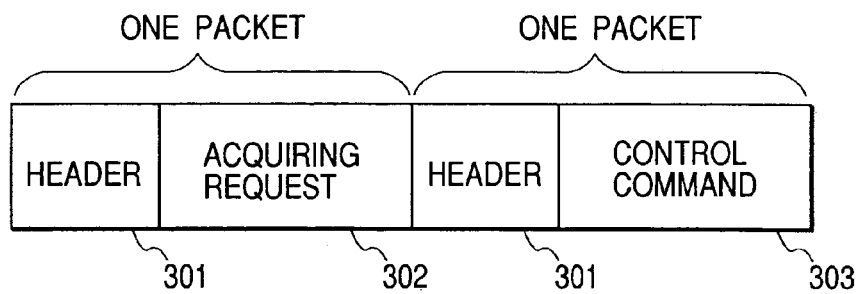

FIGS. 8A to 8C show the structures of packets for the camera control command to be transmitted from the clients 1-2, 1-3, 1-4, . . . . FIG. 8A shows the structure of a packet when a camera control command is transmitted to the camera server. FIG. 8B shows the structure of a packet when an acquisition request for the camera control right as well as a camera control command is transmitted. FIG. 8C shows the structure of packets, a packet for an acquisition request for the camera control right being first transmitted and in succession a packet for a camera control command being transmitted to the camera server.

In FIGS. 8A to 8C, a header stores information specific to the client such as an ID address of the client. A field 302 stores information specific to the client. A field 303 stores data necessary for an acquisition request for the camera control right.

The packet shown in FIG. 8B stores information on an acquisition request for the camera control right and a camera control command, and is transmitted to the camera server at Step S702 in the flow chart shown in FIG. 7.

For the packets shown in FIG. 8C, the packet storing information necessary for an acquisition request for the camera control right is first transmitted and in succession the packet storing information necessary for a camera control command is transmitted, respectively to the camera server at Step S702 in the flow chart shown in FIG. 7.

In the operation to be executed by the camera control client illustrated in the flow chart of FIG. 7, the acquisition request for the camera control right and the camera control command are transmitted at the same time or in succession to the camera server. Therefore, the camera server can advantageously perform the camera control in accordance with the camera control command immediately after the client acquires the camera control right.

In this embodiment, as shown in FIG. 2, the camera control command can control the image pickup direction and zoom magnification factor of the camera. Other camera control commands may also be used, such as a focus control command, a switch command between manual and automatic focus controls, and a shutter speed control command. Also in such a case, an acquisition request for the camera control right can be automatically issued and transmitted to the camera server as in the above embodiment, if the camera control right is not still granted when such a camera control command is entered.

Also in the above embodiment, although only a single camera server is connected to the network, a plurality of camera servers may be connected to the network and the camera control right for each video camera connected to each of the camera servers is requested. Also in such a case, the object of the embodiment can be achieved by automatically requesting the camera control right to each accessed camera server connected to the network even if the camera control command is entered before the camera control right is still not granted.

In the embodiment described above, the camera server 1-1 notifies the acquisition of the control right of the video camera 1-11 to each client. Instead, the camera server 1-1 may not notify the acquisition of the control right of the video camera 1-11 to each client.

In this case, the client transmits the control command for the video camera 1-11 by using the packet of the control command shown in FIG. 8A. Upon reception of the packet shown in FIG. 8A, the camera server 1-1 reads the ID address in the header 301 of the received packet to identify the client which transmitted the control command.

In this case, the object of the embodiment can be achieved by performing any of the following operations: (1) if there is currently no client which is granted the camera control right, the camera server 1-1 grants the camera control right to the client which transmitted the control command and controls the video camera 1-11 in accordance with the control command, (2) if the camera control right is already granted to the client which transmitted the control command, the camera server 1-1 controls the video camera 1-11 in accordance with the control command, as usual, and (3) if the camera control right is already granted to another client, the control command other than that transmitted by the client with the camera control right is invalidated.

The invention is also applicable to a system or apparatus whose computer (or CPU or MPU) runs to read and execute software programs realizing the functions of the above-described embodiment and stored in a storage medium.

In this case, the software program codes themselves read from a storage medium realize the embodiment functions. Therefore, the storage medium storing such program codes, constitute the present invention.

The storage medium storing such program codes may be a floppy disk, a hard disk, an optical disk, a photomagnetic disk, a CD-ROM, a CD-R, a magnetic tape, a non-volatile memory card, and a ROM.

The scope of the invention also includes only the case wherein the embodiment functions are realized by executing the program codes read by the computer but also the case wherein the embodiment functions are realized by the process, a part or the whole of which process is executed in accordance with the program codes, by an OS (operating system) on which the computer runs.

Furthermore, the scope of the invention also includes the case wherein in accordance with the program codes stored in a memory of a function expansion board or unit connected to the computer supplied with the program codes, a CPU or the like of the function board or unit executes part or the whole of the actual tasks for realizing the embodiment functions.

In applying the embodiments to a storage medium, the program codes corresponding to the flow charts described above are stored in the storage medium. In short, modules essential for the camera control system of this invention is stored in the storage medium.

As described so far, according to the embodiment, an acquisition request for the camera control right is automatically transmitted to the camera server even if a camera control command is entered before the camera control right is still not granted. Accordingly, a user can uses the camera control system freely and with ease.

Many widely different embodiments of the present invention may be constructed without departing from the spirit and scope of the present invention. It should be understood that the present invention is not limited to the specific embodiments described in the specification, except as defined in the appended claims.

What is claimed is:

1. A camera control system capable of controlling a video camera connected to a camera server by transmitting a video camera control command from a client, wherein said client comprises input unit for inputting a video camera control command to place a video camera control request for controlling the camera to the camera server; and control request transmitting unit for transmitting a video camera control right acquisition request which includes information to issue a permission of the video camera control right to be placed to the camera server, in response to input of the video camera control command which does not include the information from said input unit, and wherein the camera server comprises permission command issuing unit for issuing the permission of the video camera control right to said client, in response to the video camera control right acquisition request for the video camera issued by said control request transmitting unit of said client; and control unit for controlling the video camera in accordance with the video camera control command issued by said client.

2. A camera control system according to claim 1, wherein if the client is not granted the video camera control right, said control request transmitting unit transmits the video camera control right acquisition request for the video camera.

3. A camera control system according to claim 1, wherein the client further comprises:
storage unit for storing the video camera control command input by said input unit, the video camera control command according to the transmission of the video camera control right acquisition request for the video camera; and
control command issuing unit for issuing the video camera control command stored in said storage unit to the camera server, when a permission of the video camera control right is issued from said permission command issuing unit.

4. A camera control system according to claim 1, wherein said control request transmitting unit transmits at the same time the video camera control right acquisition request for the video camera and the video camera control command input by said input unit.

5. A camera control system according to claim 1, wherein said control request transmitting unit transmits the video camera control right acquisition request for the video camera and in succession the video camera control command input by said input unit.

6. A camera control system according to claim 1, wherein the video camera control command includes at least one of an image pickup direction and a zoom magnification factor of the video camera.

7. A client capable of controlling a video camera via a network, comprising:
input unit for inputting a video camera control command to place a video camera control request for controlling the camera to the camera server; and
control request transmitting unit for transmitting a video camera control right acquisition request which includes information to issue a permission of the video camera control right to be placed to the camera server, in response to input of the video camera control command which does not include the information from said input unit.

8. A client according to claim 7, wherein if the client is not granted the video camera control right, said control request transmitting unit transmits the video camera control right acquisition request for the video camera.

9. A client according to claim 7, wherein the client further comprises:
storage unit for storing the video camera control command input by said input unit, the video camera control command according to the transmission of the video camera control right acquisition request for video camera; and
control command issuing unit for issuing the video camera control command stored in said storage unit to a camera server, when a permission of the video camera control right is issued.

10. A client according to claim 7, wherein said control request transmitting unit transmits at the same time the video camera control right acquisition request for the video camera and the video camera control command input by said input unit.

11. A client according to claim 7, wherein said control request transmitting unit transmits the video camera control right acquisition request for the video camera and in succession the video camera control command input by said input unit.

12. A client according to claim 7, wherein the video camera control command includes at least one of an image pickup direction and a zoom magnification factor of the video camera.

13. A camera server for controlling a video camera in accordance with an input video camera control command, comprising:
control unit for controlling the video camera in accordance with a video camera control command issued by a client granted a video camera control right;
reception unit for receiving at least one of a video camera control right acquisition request and a video camera control command from a client; and
permission command issuing unit for issuing a permission command of the video camera control right to a client in response to the video camera control right acquisition request received by said reception unit,
wherein when said reception unit receives both the video camera control command and the video camera control right acquisition request from a client while the client is not granted the video camera control right but said permission command issuing unit can issue the permission command to the client, said control unit controls the video camera in accordance with the video camera control command.

14. A method of controlling a video camera by a client via a network, comprising the step of:
  inputting a video camera control command to place a video camera control request for controlling the camera to the camera server; and
  transmitting a video camera control right acquisition request which includes information to issue a permission of the video camera control right to be placed to the camera server, in response to input of the video camera control command which does not include the information.

15. A method of controlling a video camera by a client via a network according to claim 14, wherein if the client is not granted the video camera control right, the video camera control right acquisition request for the video camera is transmitted.

16. A method of controlling a video camera by a client via a network according to claim 14, further comprising the steps of:
  storing the input video camera control command, the input video camera control command being associated with the transmission of the video camera control right acquisition request for the video camera; and
  issuing the stored video camera control command to a camera server, when a permission of the video camera control right is issued.

17. A method of controlling a video camera by a client via a network according to claim 14, wherein the video camera control right acquisition request for the video camera and the input video camera control command are transmitted at the same time.

18. A method of controlling a video camera by a client via network according to claim 14, wherein the video camera control right acquisition request for the video camera is transmitted and in succession the input video camera control command is transmitted.

19. A method of controlling a video camera by a client via a network according to claim 14, wherein the video camera control command includes at least one of an image pickup direction and a zoom magnification factor of the video camera.

20. A method of controlling a video camera by a camera server in accordance with an input video camera control command, comprising the steps of:
  controlling the video camera in accordance with a video camera control command issued by a client granted a video camera control right;
  receiving at least one of a video control right acquisition request and a video camera control command from a client; and
  issuing a permission command of the video camera control right to a client in response to the video camera control right acquisition request received in said receiving step,
  wherein when said receiving step receives both the video camera control command and video camera control right acquisition request from a client while the client is not granted the video camera control right but said permission command issuing step can issue the permission command to the client, the video camera is controlled in accordance with the video camera control command.

21. A storage medium storing a computer readable program for controlling a video camera by a client via a network, the program comprising the steps of:
  inputting a video camera control command to place a video camera control request for controlling the camera to the camera server; and
  transmitting a video camera control right acquisition request which includes information to issue a permission of the video camera control right to be placed to the camera server, in response to input of the video camera control command which does not include the information.

22. A storage medium according to claim 21, wherein if the client is not granted the video camera control right, the video camera control right acquisition request for the video camera is transmitted.

23. A storage medium according to claim 21, wherein the program further comprises the steps of:
  storing the input video camera control command, the input video camera control command being associated with the transmission of the video camera control right acquisition request for the video camera; and
  issuing the stored video camera control command to a camera server, when a permission of the video camera control right is issued.

24. A storage medium according to claim 21, wherein the video camera control right acquisition request for the video camera and the input video camera control command are transmitted at the same time.

25. A storage medium according to claim 21, wherein the video camera control right acquisition request for the video camera is transmitted and in succession the input video camera control command is transmitted.

26. A storage medium according to claim 21, wherein the video camera control command includes at least one of an image pickup direction and a zoom magnification factor of the video camera.

27. A storage medium storing a computer readable program for controlling a video camera by a camera server in accordance with an input video camera control command, the program comprising the steps of:
  controlling the video camera in accordance with a video camera control command issued by a client granted a video camera control right;
  registering at least a client requesting acquisition of a video camera control right; and
  receiving at least one of a video control right acquisition request and a video camera control command from a client; and
  issuing the permission command of the video camera control right to a client in response to the video camera control right acquisition request received in said reception step,
  wherein when said receiving step receives both the video camera control command and video camera control right acquisition request from a client while the client is not granted the video camera control right but said permission command issuing step can issue the permission command to the client, the video camera is controlled in accordance with the video camera control command.

28. A camera server according to claim 13, wherein the video camera control command includes at least one of an image pickup direction and a zoom magnification factor of the video camera.

* * * * *